United States Patent

Hofmann et al.

[11] Patent Number: 5,943,858
[45] Date of Patent: Aug. 31, 1999

[54] PREMIXING CHAMBER FOR AN EXHAUST GAS PURIFICATION SYSTEM

[75] Inventors: Lothar Hofmann, Burgkunstadt; Oliver Pfaff, Coburg; Udo Klumpp, Marktgraitz; Wieland Mathes, Michelau, all of Germany

[73] Assignee: Siemens Aktiengesellschaft, Munich, Germany

[21] Appl. No.: 08/974,259

[22] Filed: Nov. 19, 1997

Related U.S. Application Data

[63] Continuation of application No. PCT/DE96/00860, May 15, 1996.

[30] Foreign Application Priority Data

May 19, 1995 [DE] Germany ............... 195 18 516

[51] Int. Cl.⁶ .............. F01N 3/00; B29C 45/20; A62C 5/00
[52] U.S. Cl. ............ 60/303; 239/86; 239/311
[58] Field of Search ............ 60/286, 303, 297; 239/86, 418, 419, 433, 432

[56] References Cited

U.S. PATENT DOCUMENTS

| | | | |
|---|---|---|---|
| 834,203 | 10/1906 | Higgins | 239/419 |
| 2,198,998 | 4/1940 | Honsberger | 239/419 X |
| 3,587,974 | 6/1971 | Rosenkratz et al. | 239/433 X |
| 3,692,244 | 9/1972 | Lincoln | 239/419 |
| 4,511,087 | 4/1985 | Matsumoto | 239/433 |
| 5,281,403 | 1/1994 | Jones . | |
| 5,369,956 | 12/1994 | Daudel et al. | 60/286 X |

FOREIGN PATENT DOCUMENTS

| | | |
|---|---|---|
| 0398141A2 | 11/1990 | European Pat. Off. . |
| 0497034A1 | 8/1992 | European Pat. Off. . |
| 0586913A2 | 3/1994 | European Pat. Off. . |
| 0586913A3 | 3/1994 | European Pat. Off. . |
| 0617199B1 | 9/1994 | European Pat. Off. . |
| 2374965 | 7/1978 | France . |
| 2552344 | 3/1985 | France . |
| 2709217 | 9/1978 | Germany . |
| 2418414C2 | 3/1987 | Germany . |
| 3320688C2 | 7/1987 | Germany . |
| 3800730A1 | 8/1988 | Germany . |
| 9016641 | 4/1991 | Germany . |
| 4118538A1 | 12/1992 | Germany . |
| 4221363A1 | 1/1993 | Germany . |
| 4310185C1 | 6/1994 | Germany . |
| 4417238A1 | 9/1994 | Germany . |
| 4310926A1 | 10/1994 | Germany . |
| 4315278A1 | 11/1994 | Germany . |
| 4417709A1 | 11/1995 | Germany . |
| 311501 | 10/1933 | Italy ............... 239/419 |
| 1228918 | 5/1986 | U.S.S.R. ............... 239/419 |

OTHER PUBLICATIONS

Japanese Patent Abstract No. 59049824 (Toshio), dated Mar. 22, 1984.
Japanese Patent Abstract No. 2207119 (Hiroshi et al.), dated Aug. 16, 19190.
"Ammonia: It's coming to a plan near you" (Jason Makansi), Power, May 1992, pp. 16, 21, and 22.
Japanese Patent Abstract No. 61000470 (Kazuyoshi et al.), dated Jan. 6, 1986.
Japanese Patent Abstract No. 5–269348 (Tanazawa et al.), dated Oct. 19, 1993.

*Primary Examiner*—John E. Ryznic
*Attorney, Agent, or Firm*—Herbert L. Lerner; Laurence A. Greenberg

[57] ABSTRACT

A premixing chamber of a nebulizing device for an exhaust gas purification system serves to mix a compressed gas such as compressed air, for example, with a reducing agent such as urea solution, for example. The premixing chamber is set up on the carburetor principle and includes a compressed gas feed having a taper and a reducing agent feed opening in the region of the taper. The premixing chamber ensures that no deposits originating from the reducing agent can settle in the region of the mixing route. The premixing chamber is provided, in particular, for an exhaust gas purification system of a vehicle fitted with a regulated diesel catalytic converter as well as for stationary diesel engines of up to about 1000 kW (mechanical power).

13 Claims, 2 Drawing Sheets

5,943,858

PREMIXING CHAMBER FOR AN EXHAUST GAS PURIFICATION SYSTEM

CROSS-REFERENCE TO RELATED APPLICATION

This application is a continuation of International Application Serial No. PCT/DE96/00860, filed May 15, 1996.

BACKGROUND OF THE INVENTION

FIELD OF THE INVENTION

The invention relates to a premixing chamber for mixing a compressed gas, such as compressed air, with a reducing agent, such as urea solution or ammonia water, for an exhaust gas purification system. The invention also relates to a nebulizing device for an exhaust gas purification system having a premixing chamber.

The premixing chamber is used, in particular, in an exhaust gas purification system fitted with a regulated or controlled diesel catalytic converter (CDC) in an internal combustion engine. It can also be used in an exhaust gas purification system for stationary diesel engines, e.g. up to 1000 kW mechanical power.

The principle of the regulated or controlled diesel catalytic converter (CDC) has proved to be an expedient method of reducing pollutants, especially the oxides of nitrogen, contained in the exhaust gas from an internal combustion engine. That method is applied primarily in internal combustion engines which are operated with excess air, such as in diesel and lean-burn engines, for example. That method, which is based essentially on the principle of selective catalytic reduction (SCR), has in the meantime been disclosed in numerous publications such as, for example, in German Published, Non-Prosecuted Patent Applications DE 43 09 891 A1, corresponding to U.S. application Ser. No. 08/490,115, filed Jun. 12, 1995; DE 43 10 926 A1; and DE 43 15 278 A1, corresponding to U.S. application Ser. No. 08/551,791, filed Nov. 7, 1995. In the SCR method, the oxides of nitrogen are contacted, together with ammonia, on a selective catalyst and are converted there to environmentally non-harmful nitrogen and water.

Due to the risk associated with the use of ammonia, namely toxicity, and due to the noxious odor ammonia causes, ammonia as such should not be carried in the vehicle if the internal combustion engine is fitted with a CDC system. Therefore, a reducing agent that is necessary for the catalytic conversion of the oxides of nitrogen is transported in the vehicle in the form of an aqueous urea solution. In each case the ammonia is produced by hydrolysis from that aqueous urea solution in the quantity required at any given moment to convert the oxides of nitrogen. In stationary smoke gas purification systems, e.g. downstream of power plants, pure ammonia or ammonia water can be used.

In accordance with German Published, Non-Prosecuted Patent Application DE 44 17 238 A1, provision is made for the exhaust-gas conduit of a diesel engine of a truck to be led directly up to the side of a cylindrical inlet chamber in which a funnel-shaped perforated metal sheet is disposed. An injection valve which is provided at the narrowest point of the funnel is used to inject an aqueous urea solution into an interior space of the funnel. In that way, a homogeneous distribution of the urea solution in the exhaust gas is achieved over the entire cross section of the inlet chamber. Adjoining the inlet chamber are a hydrolysis catalyst, a DeNO$_x$ catalyst and, if appropriate, an oxidation catalyst.

A solution which differs from the above is described in Published European Patent Application 0 586 913 A2 and is used as a basis in the introduction. A mixing device or premixing chamber is provided in order to obtain sufficient atomization of the medium to be nebulized, i.e. urea solution as the reactant, before it is introduced into the flow of exhaust gas containing pollutants. The medium and a compressed gas such as air, are introduced into the premixing chamber for intimate mixing with one another, i.e. to form an emulsion. The premixing chamber is connected through the use of a single mixing conduit or pipe to a nebulizing nozzle which, in turn, is disposed in the flow of exhaust gas. In the mixing chamber according to FIG. 2 of that publication, the compressed gas impinges laterally or tangentially on the flow of medium. It is possible to achieve quite a good distribution of the reducing agent liquid throughout the flow of exhaust gas with that premixing and spraying-in. In that case, the use of the compressed air also brings about cooling of the injection nozzle located in the hot flow of exhaust gas. However, a problem can occur when using the nebulizing device for spraying in an aqueous urea solution for the reduction of NO$_x$, because that may cause crystals of urea and exhaust gas residues to be deposited in the process. In order to eliminate that disadvantage, it is proposed in that publication to cover the surface areas of the nebulizing device which come into contact with the urea with a catalytic coating. In the case of the nozzle, platinum coating and/or heating-up are also considered in addition. However, those aids are comparatively expensive.

The premixing chamber is particularly critical with regard to deposits in the nebulizing device. It has actually been shown that dry urea is deposited in the air conduit connected to the side of the premixing chamber for the purpose of tangential impingement, with the urea leading to the air conduit becoming blocked, specifically just before it opens into the premixing chamber, in particular, in the case of prolonged uninterrupted operation. The changed pressure conditions thus caused in the premixing chamber result in incorrect metering of urea solution. That must definitely be avoided.

A premixing chamber for producing a homogeneous mixture of a compressed gas and a reducing agent is also known from German Published, Non-Prosecuted Patent Application DE 42 21 363 A1. In that case, a feed pipe for the reducing agent projects perpendicularly to the flow direction of the compressed gas into a feed pipe for the compressed gas, with the feed pipe being widened in a funnel shape toward the outlet. However, that does not prevent the reducing agent from also flowing out counter to the flow direction of the compressed gas and forming deposits there. Such a premixing chamber, operating on the principle of a spray gun, is also not very efficient.

SUMMARY OF THE INVENTION

It is accordingly an object of the invention to provide a premixing chamber for an exhaust gas purification system and a nebulizing device for an exhaust gas purification system having a premixing chamber, which overcome the hereinafore-mentioned disadvantages of the heretofore-known devices of this general type and in which the premixing chamber is constructed with comparatively little outlay in such a way that deposits and thus incorrect metering are avoided.

With the foregoing and other objects in view there is provided, in accordance with the invention, a premixing chamber according to the carburetor principle for mixing a compressed gas, such as compressed air, with a reducing agent, such as urea solution or ammonia water, for an exhaust gas purification system, comprising a compressed gas feed having a straight compressed gas duct with a taper; and a reducing agent feed having a straight conduit disposed approximately centrally in the compressed gas duct, the straight conduit for the reducing agent opening in the vicinity of the taper.

In this case, the term "feed" is understood to mean any kind of flow path, e.g. conduit, duct, bore, pipe or capillary. The term "taper" is understood to mean the region of the smallest cross section.

The invention is based on the consideration that the liquid reducing agent, such as urea solution or ammonia water, should merge in a defined manner with the compressed gas, such as air, at that location at which the flow of the compressed gas is accelerated and at which a correspondingly low pressure thus prevails. This is achieved in the carburetor principle, for example, by the compressed gas flowing around the feed for the reducing agent, guided in parallel, at the outlet opening. This prevents the liquid reducing agent from flowing into the feed for the compressed gas (flow path for the compressed gas), because the pressure of the compressed gas increases counter to the flow, as viewed from the opening of the feed for the reducing agent (flow path for the reducing agent). A particularly simple structural principle thus results, which is suitable, in particular, for mixing compressed gas with urea solution or ammonia water.

In accordance with another feature of the invention, the straight conduit for the reducing agent is a capillary which is preferably made of special steel.

In accordance with a further feature of the invention, the capillary is fastened in a guide part of the feed which can be screwed, preferably centrally, into a housing of the premixing chamber, which may be made of metal. In accordance with an added feature of the invention, the guide part is formed of plastic.

In accordance with an additional feature of the invention, there is provided a connection duct opening laterally into the straight compressed gas duct. In accordance with yet another feature of the invention, the connection duct opens into the straight compressed gas duct at an obtuse angle.

In accordance with yet a further feature of the invention, there is provided a metering valve disposed directly upstream of the premixing chamber and preferably directly on the guide part.

With the objects of the invention in view, there is also provided a nebulizing device for an exhaust gas purification system, comprising the premixing chamber; a mixing conduit connected to the compressed gas feed downstream of the taper; and a nebulizing nozzle connected to the mixing conduit.

A nebulizing device of this type is suitable, in particular, for metering a reducing agent into an exhaust gas containing oxides of nitrogen.

In accordance with a concomitant feature of the invention, the nebulizing nozzle is disposed in an exhaust gas duct for an exhaust gas containing oxides of nitrogen.

Other features which are considered as characteristic for the invention are set forth in the appended claims.

Although the invention is illustrated and described herein as embodied in a premixing chamber for an exhaust gas purification system and a nebulizing device for an exhaust gas purification system having a premixing chamber, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
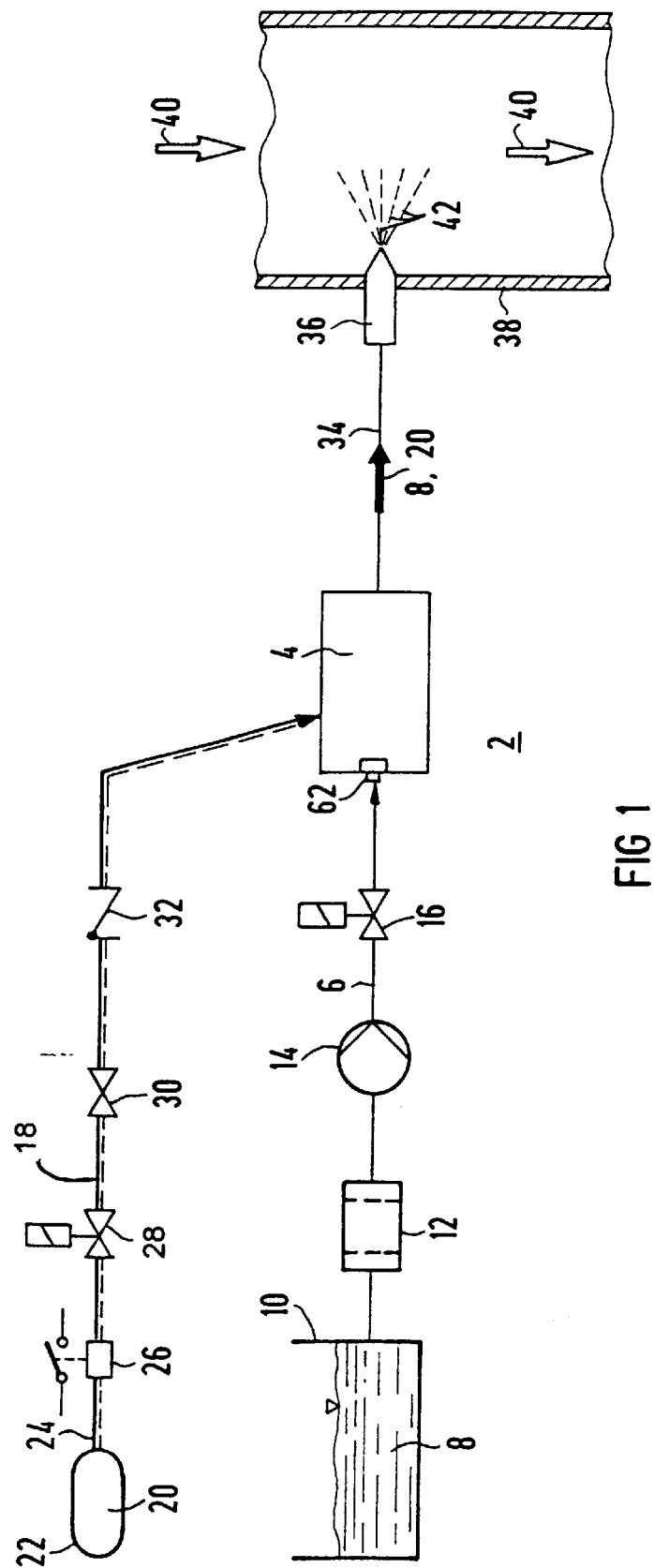
FIG. 1 is a diagrammatic and schematic representation of a nebulizing device which is fitted with a premixing chamber and is intended for an exhaust gas purification system for an internal combustion engine.

Referring now to the figures of the drawings in detail and first, particularly, to FIG. 1 thereof, there is seen a nebulizing device 2 which includes a central component in the form of a mixing device or premixing chamber 4 that is constructed on the carburetor principle. The latter will be explained below with reference to FIG. 2.

A feedline 6 which opens into the mixing device 4 is provided for a medium to be nebulized, in particular a reducing agent 8 such as aqueous urea solution. The reducing agent 8 is accommodated in a supply container 10 which is carried in the vehicle having exhaust gas that is to be purified. This supply container 10 is connected to the mixing device 4 through the use of a filter 12, a pump 14 which serves to generate pressure, and a metering valve 16 that is located in the feedline 6. In particular, the metering valve 16 may be connected directly upstream of the mixing chamber 4. The reducing agent to be nebulized is delivered with the aid of the pump 14 into a mixing compartment of the mixing device 4. In this case, a metering rate required per unit of time is predetermined with the aid of the metering valve 16.

A compressed gas 20, such as compressed air, for example, passes through a further feedline 18 into the premixing chamber 4. In the premixing chamber 4, this compressed gas 20 mixes with the reducing agent 8 that is flowing in. In the process, an aerosol 8, 20 is obtained, which is given off at an outlet.

The compressed gas 20 is accommodated in an accumulator or pressure store 22 which is provided with an air outlet 24. The compressed gas 20 is conducted from the air outlet 24 through an electrically actuable pressure switch 26, a shut-off valve 28, a pressure control valve 30 and a non-return valve 32, into the premixing chamber 4.

The mixture 8, 20 which is produced in the premixing chamber 4 passes through a mixing conduit 34 to a nebulizing nozzle 36 which is accommodated in an exhaust gas pipe or duct 38. In the exhaust gas pipe 38, exhaust gas 40 to be purified flows in the direction of a non-illustrated catalytic converter configuration of known construction which may, in particular, be of the type mentioned at the outset. The nebulizing nozzle 36 ensures that the mixture of reducing agent 8 and compressed gas 20 is injected, in the form of a fine mist 42, into the flow of exhaust gas 40 and is carried along and evenly distributed by the latter in the direction of the catalytic converter configuration.

Figure 2:
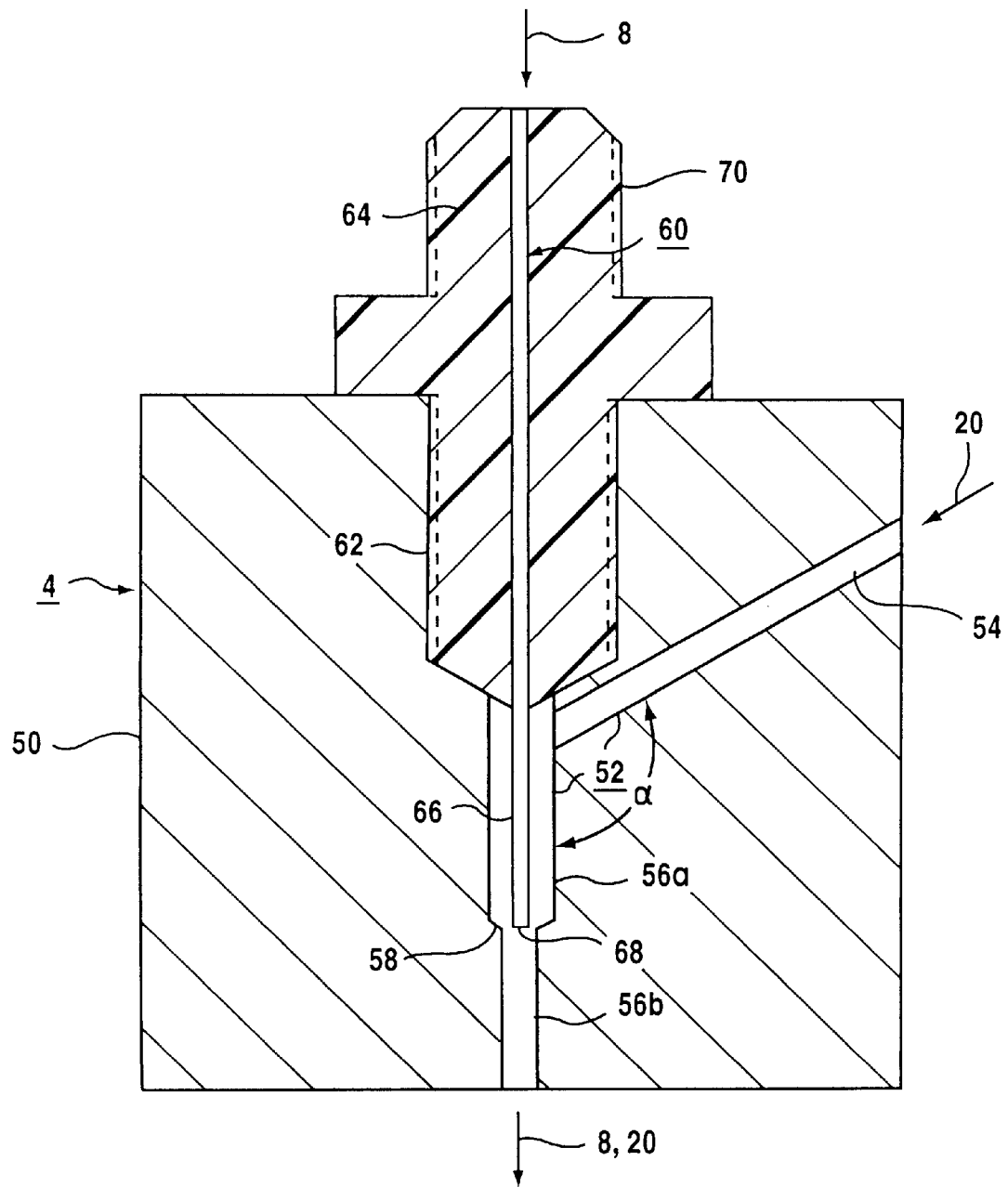
FIG. 2 is a diagrammatic, sectional view of an embodiment of the premixing chamber according to the invention.

According to FIG. 2, the premixing chamber 4 includes a housing 50 which is formed, in particular, of a metal, such as special steel, for example. The housing 50 has a continuous central longitudinal bore with three different cross sections.

A feed 52 which is provided for the compressed gas 20 includes a lateral connection duct 54 and a central duct 56*a*, 56*b* with a downward taper 58. The connection duct 54, through which the compressed gas 20 is fed from the outside, opens into the central straight duct 56*a*, 56*b* approximately centrally in the housing 50. The connection duct 54 is disposed laterally of the central straight compressed gas duct 56*a* at an obtuse angle $\alpha$. It is particularly important that the upper and wider part 56*a* of the central compressed gas duct 56*a*, 56*b*, that is to say the part located above the taper 58, serves as a steadying route for the compressed gas 20 flowing in from the side.

A feed 60 is provided for the reducing agent 8. For this purpose, an upper part of the continuous central longitudinal bore is constructed as a relatively wide threaded bore 62. A guide part 64 is screwed into the threaded bore 62. The guide part 64 has a T-shaped cross section as shown, and terminates the upper compressed gas duct 56*a*. The guide part 64 is preferably formed of a plastic and it contains a continuous small pipe or capillary 66 in the center. In this case, the capillary 66 is held by the guide part 64. The capillary 66 is preferably formed of a metal, such as special steel, for example, and is relatively thin. It may, for example, have an outside diameter of 1 mm and an inside diameter of 0.65 mm. In this case, the capillary 66 is the feed 60 for the reducing agent. The conduit 56*b* for the developing emulsion 8, 20 may then have an inside diameter of about 2 mm.

It is furthermore important that the straight conduit or capillary 66 for the reducing agent be disposed approximately centrally in the compressed gas duct 56*a*, 56*b* and open approximately in the region of the taper 58. FIG. 2 shows that an end 68 of the capillary 66 lies directly in the taper 58. It may also be disposed slightly lower.

In the region of the capillaries 66, specifically between the opening of the lateral duct 54 and the taper 58, the compressed gas duct 56*a* must provide a sufficiently long part-duct as a steadying route for the compressed gas 20. In this case, a certain negative pressure then develops in this compartment due to the flow conditions in the region of the taper 58, according to the Bernoulli principle. As a result, the liquid reducing agent 8 cannot flow in the reverse direction and precipitate as a deposit, e.g. as solid urea, in the region of the feed 52 for the compressed gas. This ensures that the opening cross section will not vary over the course of time, causing the metering brought about by the metering valve 16 to remain constant.

It should be noted that, in the present construction, the flow directions of the operating material (reducing agent 8) and the carrier fluid (compressed gas 20) are largely parallel even before the operating material is fed into the carrier fluid, as viewed in the flow direction of the compressed gas 20 acting as the carrier fluid.

The upper end of the guide part 64 may be provided with a screw-thread 70 so that the metering valve 16 can be directly screwed on at that location.

After the compressed gas (air) 20 and the reducing agent (liquid) 8 have been mixed in the region of the taper 58, changes in cross section should be avoided up to the nebulizing nozzle 36 wherever possible. The path for the emulsion 8, 20 delivered from the premixing chamber 4 should also be kept small up to the nebulizing nozzle 36.

We claim:

1. In combination with an exhaust gas purification system, a nebulizing device, comprising:

- a premixing chamber according to the carburetor principle for mixing a compressed gas with a reducing agent, said premixing chamber including a compressed gas feed having a substantially straight compressed gas duct with a taper, and a reducing agent feed having a substantially straight pipe disposed approximately centrally in said compressed gas duct, said substantially straight pipe for the reducing agent opening in the vicinity of said taper;
- a mixing conduit connected to said compressed gas feed downstream of said taper; and
- a nebulizing nozzle connected to said mixing conduit, said nebulizing nozzle disposed in an exhaust gas duct for an exhaust gas containing oxides of nitrogen.

2. The nebulizing device according to claim 1, wherein said substantially straight pipe for the reducing agent is a capillary.

3. The nebulizing device according to claim 2, wherein said capillary is formed of a stainless steel.

4. The nebulizing device according to claim 2, including a guide part in which said capillary is held.

5. The nebulizing device according to claim 4, including a housing into which said guide part is to be screwed.

6. The nebulizing device according to claim 5, wherein said housing is formed of a metal.

7. The premixing chamber according to claim 5, wherein said guide part is to be screwed centrally into said housing.

8. The nebulizing device according to claim 4, wherein said guide part is formed of plastic.

9. The nebulizing device according to claim 1, including a connection duct opening laterally into said substantially straight compressed gas duct.

10. The nebulizing device according to claim 9, wherein said connection duct opens into said substantially straight compressed gas duct at an obtuse angle.

11. The nebulizing device according to claim 1, wherein the compressed gas is compressed air.

12. The nebulizing device according to claim 1, wherein the reducing agent is selected from the group consisting of urea solution and ammonia water.

13. The nebulizing device according to claim 1, including a metering valve connected directly upstream of said premixing chamber.

* * * * *